United States Patent
Tsukamoto et al.

(10) Patent No.: US 9,595,899 B2
(45) Date of Patent: Mar. 14, 2017

(54) MOTOR CONTROL DEVICE

(71) Applicant: SANDEN CORPORATION, Isesaki-shi (JP)

(72) Inventors: Takeo Tsukamoto, Isesaki (JP); Daisuke Hirono, Isesaki (JP); Yuan Wang, Isesaki (JP)

(73) Assignee: SANDEN HOLDINGS CORPORATION, Isesaki-shi (JP)

(*) Notice: Subject to any disclaimer, the term of this patent is extended or adjusted under 35 U.S.C. 154(b) by 0 days.

(21) Appl. No.: 14/409,645

(22) PCT Filed: Jun. 18, 2013

(86) PCT No.: PCT/JP2013/066751
§ 371 (c)(1),
(2) Date: Dec. 19, 2014

(87) PCT Pub. No.: WO2013/191183
PCT Pub. Date: Dec. 27, 2013

(65) Prior Publication Data
US 2015/0155806 A1  Jun. 4, 2015

(30) Foreign Application Priority Data
Jun. 19, 2012 (JP) ................. 2012-137460

(51) Int. Cl.
*H02P 6/04* (2016.01)
*H02P 6/20* (2016.01)
(Continued)

(52) U.S. Cl.
CPC ............ *H02P 6/205* (2013.01); *F04B 49/06* (2013.01); *H02P 1/029* (2013.01); *H02P 6/08* (2013.01);
(Continued)

(58) Field of Classification Search
CPC .. H02P 6/205; H02P 21/0032; H02P 21/0042; H02P 6/08; H02P 1/029; H02P 6/20
(Continued)

(56) References Cited

U.S. PATENT DOCUMENTS

2008/0072619 A1  3/2008  Nojima et al.
2010/0172765 A1  7/2010  Shibuya et al.
(Continued)

FOREIGN PATENT DOCUMENTS

CN   101150293   3/2008
CN   101680445   3/2010
(Continued)

OTHER PUBLICATIONS

Search Report dated Apr. 12, 2016 issued in the corresponding European Patent Application No. 13 80 7567.6.n.

*Primary Examiner* — Jeffrey Donels
(74) *Attorney, Agent, or Firm* — Cozen O'Connor

(57) ABSTRACT

A motor control device capable of executing a start mode that takes into consideration both the start performance with respect to a residual load and the life of a drive circuit is provided. A motor control device for executing a start mode in which a rotor is rotated by forced commutation control: stores a current value at the time when a stop command to a synchronous motor is issued; and decides, when a start command to the synchronous motor is issued after the issuance of the stop command, a target current value based on the stored current value in the start mode in response to the start command.

6 Claims, 13 Drawing Sheets

(51) Int. Cl.
  *H02P 6/08*  (2016.01)
  *H02P 1/02*  (2006.01)
  *F04B 49/06* (2006.01)
  *F25B 49/02* (2006.01)

(52) U.S. Cl.
  CPC .................. *H02P 6/20* (2013.01); *H02P 6/21* (2016.02); *F25B 49/025* (2013.01); *F25B 2500/26* (2013.01); *F25B 2600/021* (2013.01)

(58) Field of Classification Search
  USPC .................................................... 318/400.11
  See application file for complete search history.

(56) References Cited

U.S. PATENT DOCUMENTS

| 2012/0068659 | A1 | 3/2012 | Seto et al. |
| 2014/0077734 | A1* | 3/2014 | Toyoda .................. H02P 6/205 318/400.11 |
| 2015/0091483 | A1* | 4/2015 | Osamura ............. H02P 21/0042 318/400.25 |

FOREIGN PATENT DOCUMENTS

| EP | 1 870 999 | 12/2007 |
| JP | 64-30485 | 2/1989 |
| JP | 64-030485 | 2/1989 |
| JP | 02-84992 | 3/1990 |
| JP | 04-67790 | 3/1992 |
| JP | 04-067790 | 3/1992 |
| JP | 10-271875 | 10/1998 |
| JP | 2010-271875 | 10/1998 |
| JP | 2000-78878 | 3/2000 |
| JP | 2000-341989 | 12/2000 |
| JP | 2004-104939 | 4/2004 |
| JP | 2010-110177 | 5/2010 |
| JP | 52-98778 | 9/2013 |
| WO | WO 2010/137096 | 12/2010 |
| WO | WO 2011/155270 | 12/2011 |

* cited by examiner

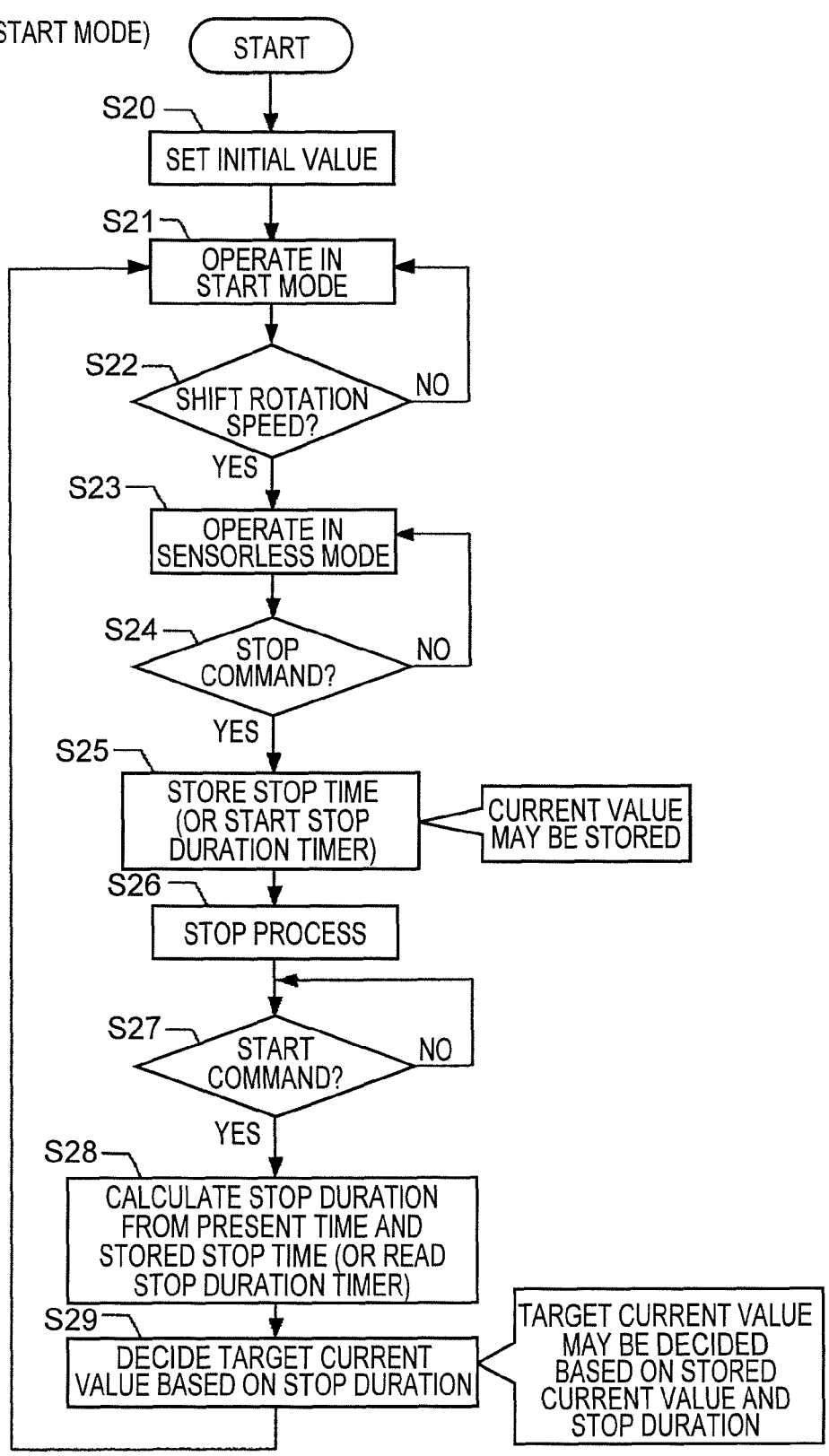

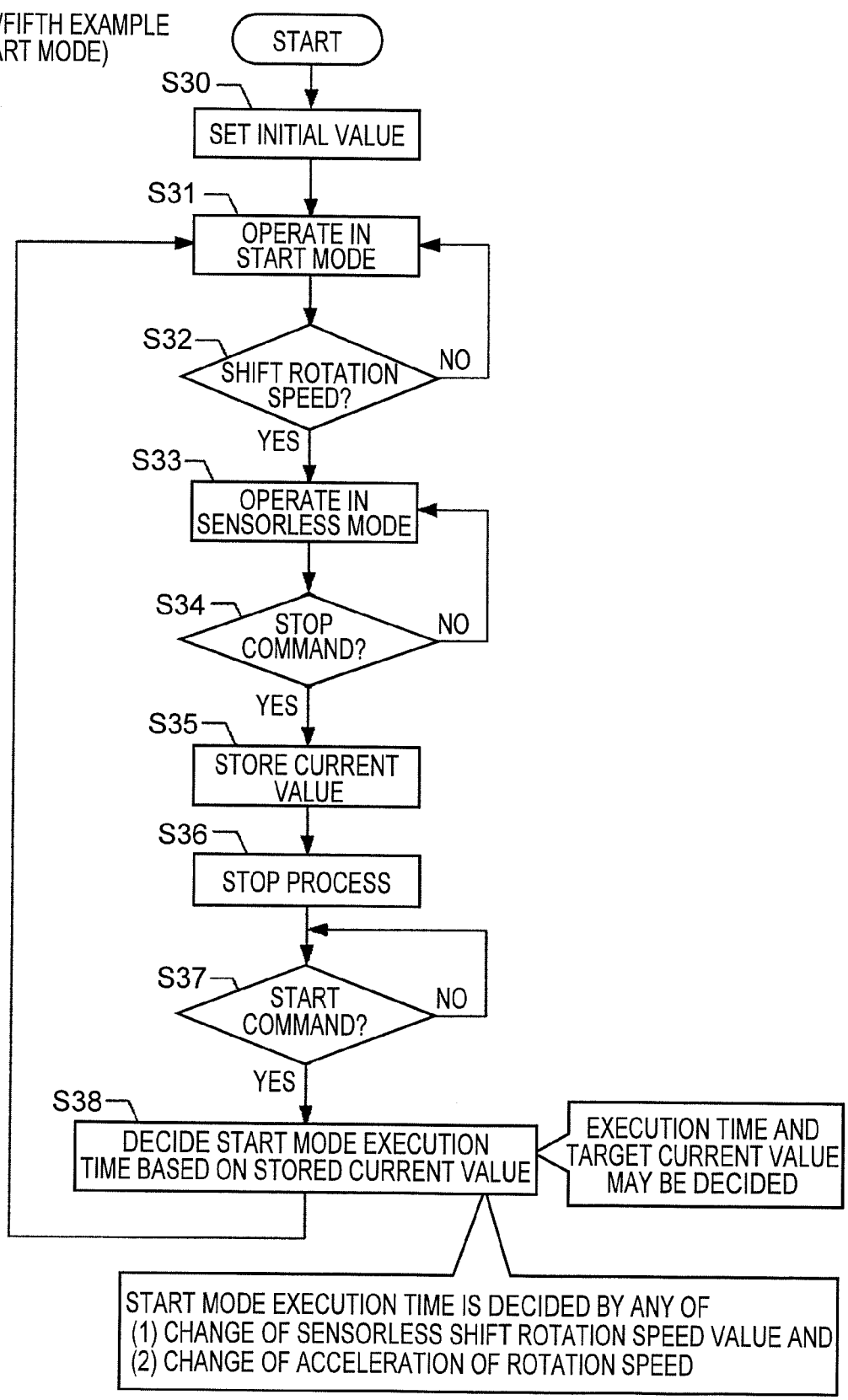

MOTOR CONTROL DEVICE

RELATED APPLICATIONS

This is a U.S. National stage of International application No. PCT/JP2013/066751 filed on Jun. 18, 2013.

This patent application claims the priority of Japanese application no. 2012-137460 filed Jun. 19, 2012 the disclosure content of which is hereby incorporated by reference.

TECHNICAL FIELD

A technique relating to synchronous motor start control is disclosed below.

BACKGROUND ART

In a synchronous motor (permanent magnet synchronous motor), which has become widely used to drive a compressor and the like, control in which the position of a rotor (rotation angle of the rotor) is sensorlessly detected to appropriately energize stator coils, is performed. The synchronous motor that is normally operated in such a sensorless mode by position detection operation needs to be in a start mode involving forced commutation operation at the time of start, as a stage preceding the sensorless mode. In the start mode, forced commutation of a drive signal is performed without rotor position detection, and the rotor is forced to rotate regardless of its position (for example, Patent Document 1).

REFERENCE DOCUMENT LIST

Patent Document

Patent Document 1: Japanese Patent Application Laid-open Publication No. 2010-110177

SUMMARY OF THE INVENTION

Problems to be Solved by the Invention

Particularly in a case of a synchronous motor used to power a compressor in a refrigeration cycle, the load condition on the motor is unknown when restarting the compressor after stop, so that forced commutation control is performed with the maximum start current that can produce the maximum torque of the synchronous motor, to enable the start regardless of the size of the load. In detail, in the compressor, the pressure difference between a discharge pressure and a suction pressure at the time of stop varies depending on the conditions at the time of stopping. The load on the synchronous motor in the start mode is therefore not uniform, and the amount of the start current necessary for successful start is not constant but unpredictable. Accordingly, forced commutation control is performed by applying the maximum start current that can produce the maximum torque of the synchronous motor, for successful start even at the maximum pressure difference.

However, repeated flow of large amounts of current in an inverter-type motor drive circuit that typically uses IGBTs affects the circuit life of the motor drive circuit. However, in general, repeated flow of large amounts of current in an inverter-type motor drive circuit that uses IGBTs affects the circuit life of the motor drive circuit. This raises the need for a motor control device capable of performing such a start mode that takes into consideration both the start performance with respect to the pressure difference and the life of the motor drive circuit, especially for a synchronous motor used to drive a compressor.

Means for Solving the Problems

In view of the problem stated above, the following aspects are proposed for a motor control device for controlling a synchronous motor with a start mode in which a rotor is rotated by forced commutation control.

A motor control device, according to a first aspect, stores a current value at the time when a stop command to the synchronous motor is issued; and decides a target current value in the start mode based on the stored current value, when a start command to the synchronous motor is issued after the issuance of the stop command.

A motor control device, according to a second aspect, stores a current value and a rotation speed value at the time when a stop command to the synchronous motor is issued; and decides a target current value in the start mode based on the stored current value and the stored rotation speed value, when a start command to the synchronous motor is issued after the issuance of the stop command.

A motor control device, according to a third aspect, decides, when a start command to the synchronous motor is issued after a stop command to the synchronous motor is issued, a target current value in the start mode based on a time from the stop command to the start command.

A motor control device, according to a fourth aspect, stores a current value at the time when a stop command to the synchronous motor is issued; and decides a time until the end of the start mode based on the stored current value, when a start command to the synchronous motor is issued after the issuance of the stop command.

Effects of the Invention

The motor control device proposed above controls the current in the start mode or the execution time (duration) of the start mode, based on the value of current flowing in the synchronous motor when the stop command is issued or the time from the stop command to the start command.

The amount of the current of the synchronous motor operated in the sensorless mode reflects the load (the above-mentioned pressure difference in a case of a compressor). The current value during operation immediately before the motor stops thus serves as a parameter representing the load at the time. Therefore, if the current upon restart after stop is controlled based on the stored current value reflecting the load at the time of stop, the probability of a start failure is reduced with no need to drive the motor with the maximum current each time. By reducing the start current in this way, the circuit life can be extended without sacrificing the start performance.

The residual load from when the synchronous motor stops to when the synchronous motor restarts decreases with time, for example in the case of the above-mentioned pressure difference of the compressor. In other words, when the synchronous motor has been stopped for a longer time, the residual load is smaller, and the current required to start the motor is smaller. Therefore, if the current in the start mode is adjusted depending on the time from the stop command to the start command, the probability of a start failure is reduced with no need to drive the motor with the maximum current each time. By reducing the start current in this way, too, the circuit life can be extended without sacrificing the start performance.

Even in a case in which forced commutation control is performed with the maximum current in the start mode, if the execution time of the start mode is decided based on the stored current value reflecting the load at the time of stopping, the start duration can be shortened depending on the load, that is, the time during which the maximum current flows can be shortened depending on the load. In this way, too, the circuit life can be extended without sacrificing the start performance.

BRIEF DESCRIPTION OF THE DRAWINGS

FIG. 10 is a flowchart of the third example start mode.

FIG. 13 is a flowchart of the fourth example start mode and the fifth example start mode.

MODE FOR CARRYING OUT THE INVENTION

Figure 1:
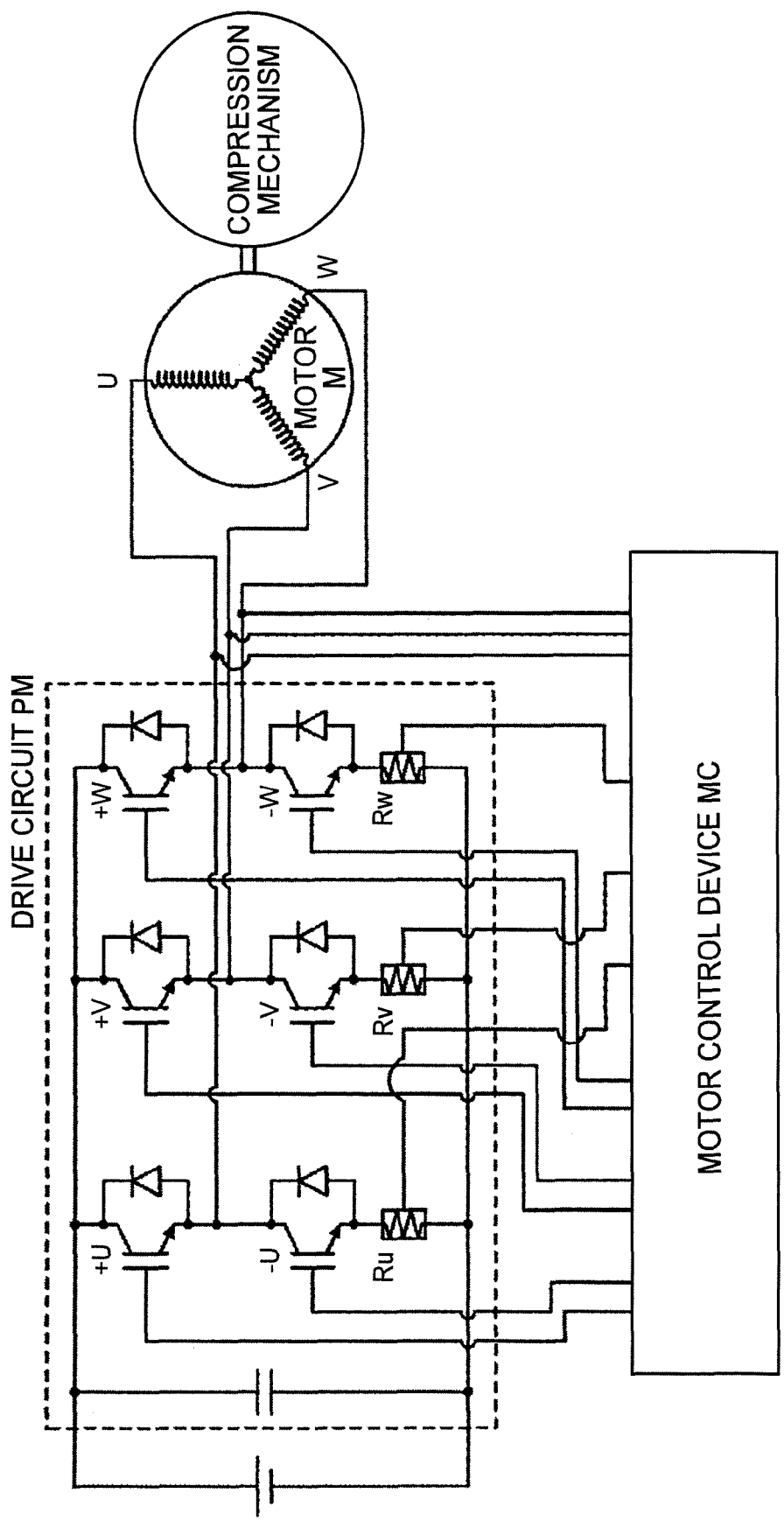
FIG. 1 is a block diagram illustrating an embodiment of a motor control device.

FIG. 1 illustrates an embodiment of a motor control device.

A synchronous motor M in this embodiment is a three-phase star connection motor, and includes a stator including stator coils of U phase, V phase, and W phase, and a rotor including permanent magnets. In the drawing, only the respective stator coils of U phase, V phase, and W phase are illustrated, and the other parts are omitted. Although a star connection motor is illustrated as an example here, a delta connection motor is equally applicable. The synchronous motor M drives a compression mechanism of a refrigerant compressor in a refrigeration cycle of an air conditioner or a heat pump, as an example.

A drive circuit (power module) PM of the synchronous motor M has a structure in which upper arm switching elements +U, +V, and +W and lower arm switching elements −U, −V, and −W are respectively connected in series with each other between the high-level side and low-level side of a dc power source, for U phase, V phase, and W phase. Shunt resistors Ru, Rv, and Rw for determining the currents flowing in the respective phases are provided on the low-level sides of the lower arm switching elements −U, −V, and −W. Each of the switching elements +U to −W using IGBTs is driven by a PWM signal from a motor control device MC, as a result of which the respective stator coils of U phase, V phase, and W phase are controlled by sinusoidal energization (180° energization). The currents flowing in the respective phases U, V, and W through this control are determined using the shunt resistors Ru, Rv, and Rw.

The motor control device MC is provided with a computer such as a microcomputer. Each unit described below is explained as be implemented in the motor control device MC by controlling hardware according to a program. However, this is not limited thereto, and for example each unit may be composed of dedicated hardware.

Figure 2:
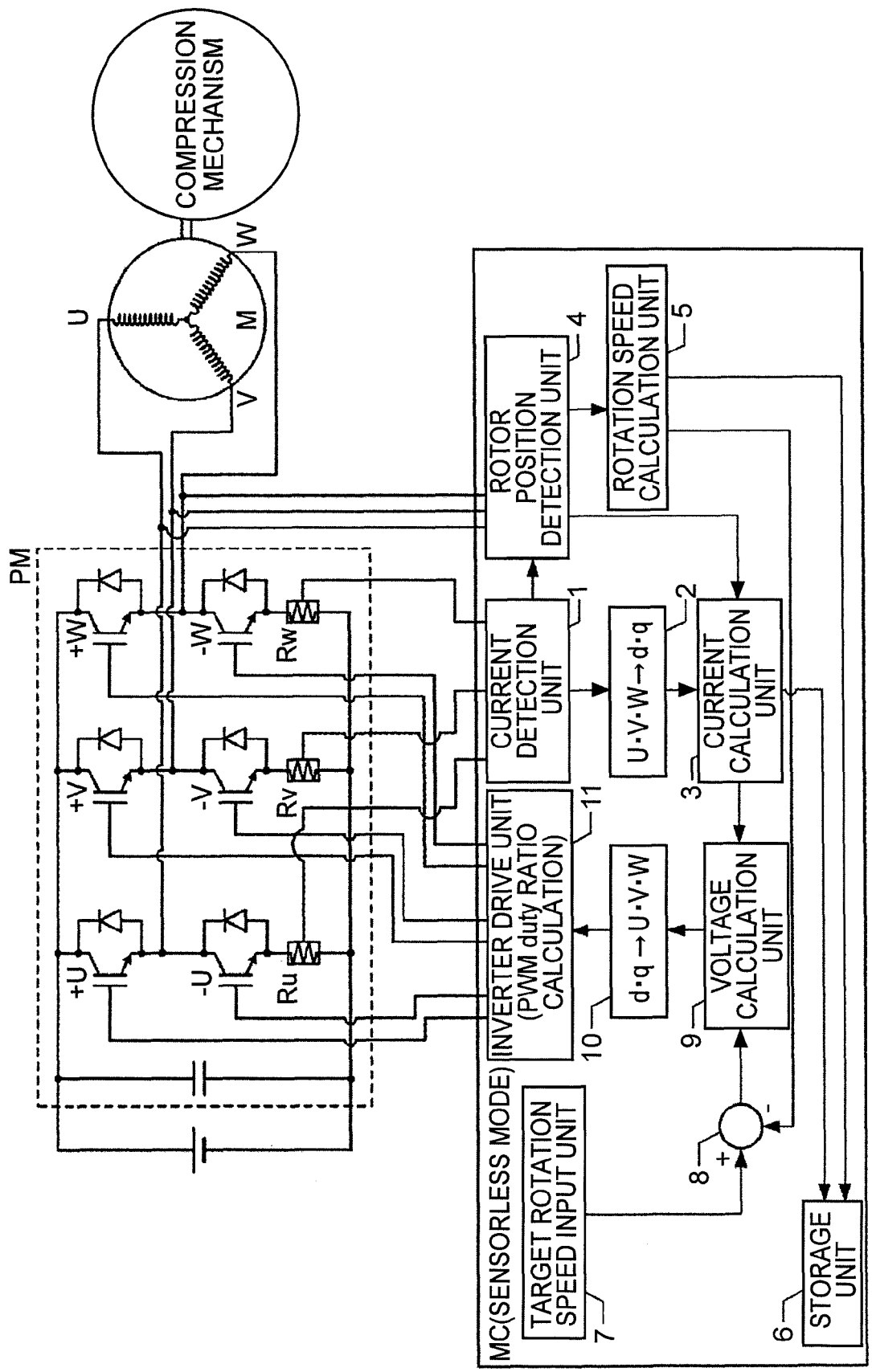
FIG. 2 is a block diagram illustrating a structural example of the motor control device according to the embodiment when executing a sensorless mode.

FIG. 2 illustrates the structure of the motor control device MC at the time of executing a sensorless mode in which the synchronous motor M is operated by position detection operation.

A current detection unit 1 determines U phase current, V phase current, and W phase current, respectively by measuring the voltages across the shunt resistors Ru, Rv, and Rw. A conversion calculation unit 2 calculates a rotor coordinate value based on the determined phase current values, and supplies the rotor coordinate value to a current calculation unit 3. A rotor position detection unit 4 calculates the phases, electrical angles, and the like of the current and the induced voltage based on the measured applied voltage and the phase currents determined by the current detection unit 1, to estimate the rotor position. A rotation speed calculation unit 5 calculates the rotation speed of the rotor based on the rotor position ($\theta$m) detected by the rotor position detection unit 4, for example by d$\theta$m/dt. The present current value of the synchronous motor M calculated by the current calculation unit 3 and the present rotation speed value of the synchronous motor M calculated by the rotation speed calculation unit 5 are supplied to and stored (or updated) in a storage unit 6 using a nonvolatile memory such as EEPROM.

An addition unit 8 performs a calculation using the rotation speed value from the rotation speed calculation unit 5 and a target rotation speed value supplied to a target rotation speed input unit 7 from outside, and supplies the resulting target rotation speed value to a voltage calculation unit 9. The target rotation speed value supplied to the target rotation speed input unit 7 is, for example, an indicated value from a system control device of an air conditioner or a heat pump. The voltage calculation unit 9 calculates a voltage value from which a PWM signal is generated, based on the current value from the current calculation unit 3 and the target rotation speed value from the addition unit 8. A conversion calculation unit 10 converts this calculated value from a rotor coordinate value to a value of U phase, V phase, and W phase. An inverter drive unit 11 generates a PWM signal based on the converted value, to control the drive circuit PM.

Figure 3:
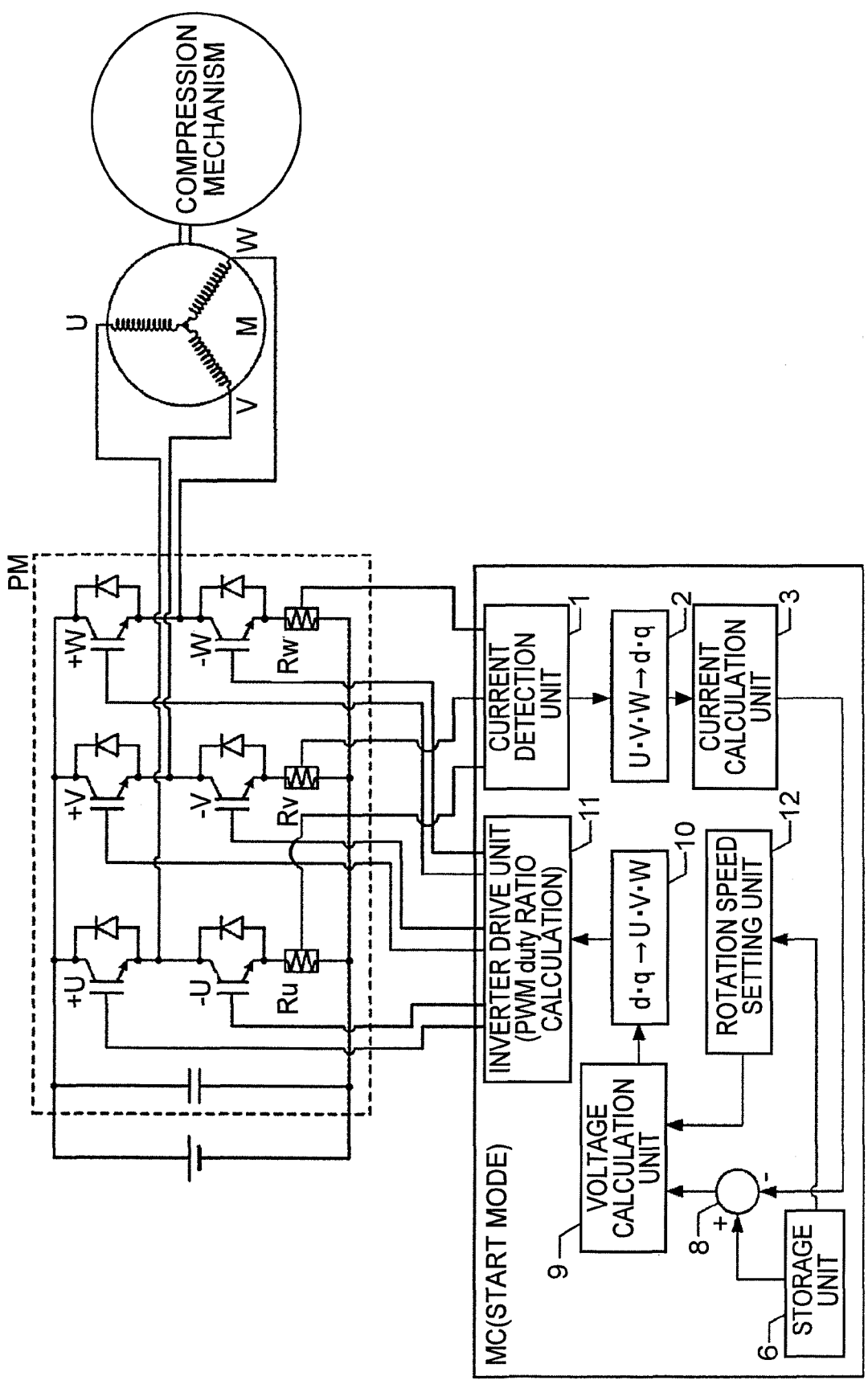
FIG. 3 is a block diagram illustrating a structural example of the motor control device according to the embodiment when executing a start mode.

FIG. 3 illustrates the structure of the motor control device MC at the time of executing a start mode in which the synchronous motor M is operated by forced commutation operation, before shifting to the above-mentioned sensorless mode. In the start mode, the rotor is forced to rotate without the position detection of the rotor, as mentioned earlier.

In the motor control device MC executing the start mode, a stored current value, a stored rotation speed value, a map value, and the like are read from the storage unit 6 and used, according to each control example described below. Each of these stored values is provided to the voltage calculation unit 9 via the addition unit 8 or to a rotation speed setting unit 12, according to each control example described below. The rotation speed setting unit 12 provides a target rotation speed value increasing at predetermined acceleration to the voltage calculation unit 9 until a shift rotation speed value for shifting to the sensorless mode is reached, according to each control example described below. The voltage calculation unit 9 calculates a voltage value from which a PWM signal is generated, based on a current value from the addition unit 8 and the target rotation speed value from the rotation speed setting unit 12. The conversion calculation unit 10 converts this calculated value from a rotor coordinate value to a value of U phase, V phase, and W phase. The inverter drive unit 11 generates a PWM signal based on the converted value, to control the drive circuit PM.

The current detection unit 1 determines each phase current as mentioned above. The conversion calculation unit 2 calculates a rotor coordinate value based on the determined phase current values. The addition unit 8 performs a calculation using the present current value of the synchronous motor M calculated by the current calculation unit 3 based on the rotor coordinate value, and the stored current value from the storage unit 6, to feed back the present current value.

The residual load and current of the compression mechanism at the time when the motor control device MC executes the start mode will be described below, with reference to FIG. 4.

When a stop command is issued in the motor control device MC during position detection operation in the sensorless mode, the motor control device MC performs a stop process to stop the synchronous motor M. For example, the stop command is issued as a stop command to stop the operation of the compressor, that is, the operation of the synchronous motor M, from an external system control device.

Figure 4A:
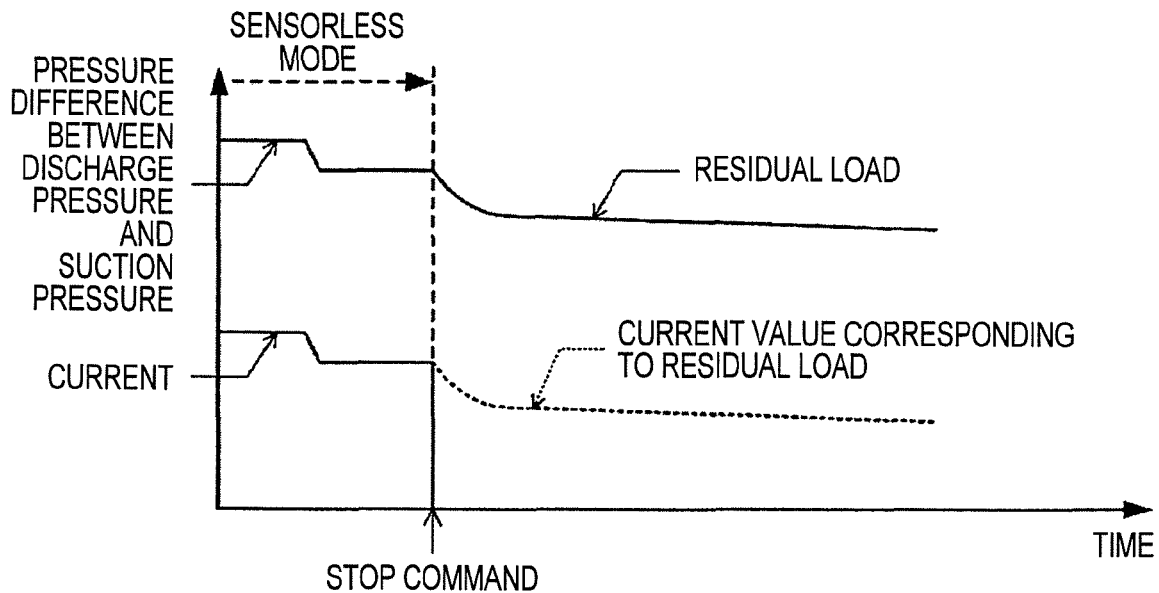
FIG. 4A is a diagram illustrating the relationship between a load and a current.

As illustrated in FIG. 4A, during the operation in the sensorless mode, the pressure difference between a discharge pressure and a suction pressure in the compression mechanism is applied as a motor load, and the current substantially correlated to the pressure difference flows in the synchronous motor M. When the operation stops in response to the stop command, the pressure difference of the compression mechanism at the time of stop remains as a load. For example, this residual load (residual pressure difference) decreases relatively rapidly while an expansion valve in the refrigeration cycle is open. After the expansion valve is closed due to stop of the refrigeration cycle, the residual load decreases more slowly with time during stop. Therefore, upon restarting the synchronous motor M after stop, the current value corresponding to the residual load is the minimum required current to start the synchronous motor M. The current value corresponding to the residual load indicated by the imaginary dotted line in the drawing is the current value of the synchronous motor M for producing torque required for the residual load of the compressor at the time of start.

Figure 4B:
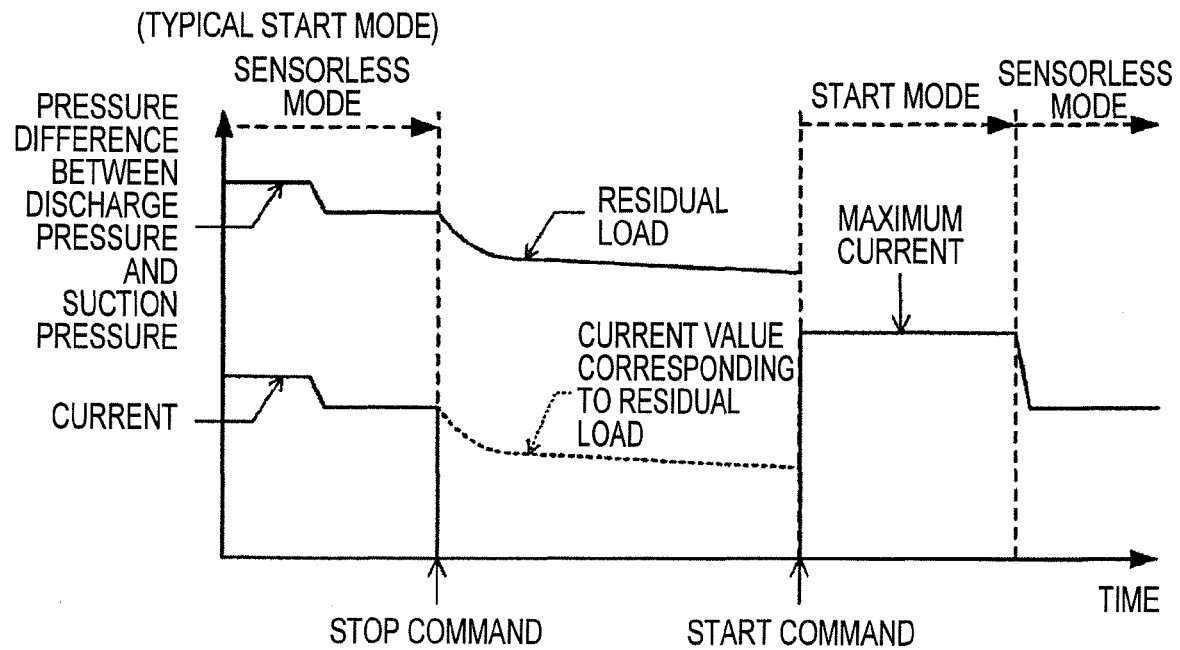
FIG. 4B is a diagram illustrating typical control for executing the start mode with a maximum current.

FIG. 4B illustrates a currently typical start mode as a related technique.

In the conventional start mode, when restarting the compression mechanism after stop, forced commutation control is performed with the maximum start current that can produce the maximum torque of the synchronous motor M to enable the start regardless of the size of the residual load, because the size of the residual load is unknown. In other words, since there is no mechanism that takes the current value corresponding to the residual load into consideration, forced commutation control of causing the maximum start current to flow is performed to produce required torque on an assumption that the residual load of the compression mechanism is maximum. However, repeated flow of the maximum current in the inverter-type drive circuit PM which uses IGBTs affects the circuit life of the drive circuit PM, as mentioned earlier.

On the other hand, the motor control device MC having the start mode structure illustrated in FIG. 3 reduces the start with the maximum current, by executing a start mode of any of first to fifth examples illustrated in FIGS. 5 to 13. In detail, the motor control device MC in this embodiment controls the current in the start mode or the execution time of the start mode, based on the value of current flowing in the synchronous motor M at the time when the stop command is issued or based on the time from the stop command to the start command.

The current value at the time when the stop command is issued (i.e. immediately before the motor stops), that is, the last current value at the time when the synchronous motor M is still rotating in the sensorless mode, serves as a parameter representing the load (pressure difference) at the time of stop, as illustrated in FIG. 4A. Therefore, if the current value at the time of issuance of the stop command is stored and, in the start mode executed upon restart after stop, the start current is controlled based on the current value stored at the time of stop, the start mode can be executed with a current close to the current value corresponding to the residual load. By the use of the current that takes into consideration the minimum required torque for the residual load at the time, the start mode with the reduced start current can be executed without sacrificing the start performance, with there being no need to always start the motor with the maximum current assuming that the load is maximum. The circuit life of the drive circuit PM can be extended in this way.

The residual load from when the synchronous motor M stops to when the synchronous motor M restarts decreases with time as illustrated in FIG. 4A, for example, in the case of the pressure difference of the compression mechanism. In other words, when the stop duration is longer, the residual load is smaller, and the current required for the subsequent restart is smaller. Therefore, if the current value in the start mode is reduced depending on the time from the stop command to the start command, the probability of a start failure is reduced with no need to always start the motor with the maximum current. By reducing the start current in this way, the circuit life of the drive circuit PM can be extended without sacrificing the start performance.

Even in a case in which forced commutation is performed with the maximum current in the start mode, if the execution time of the start mode is decided based on the stored current value reflecting the load at the time of stop, the start duration can be shortened depending on the residual load, that is, the time during which the maximum current flows can be shortened depending on the residual load. In this way, too, the circuit life of the drive circuit PM can be extended without sacrificing the start performance.

First Example Start Mode

Figure 5:
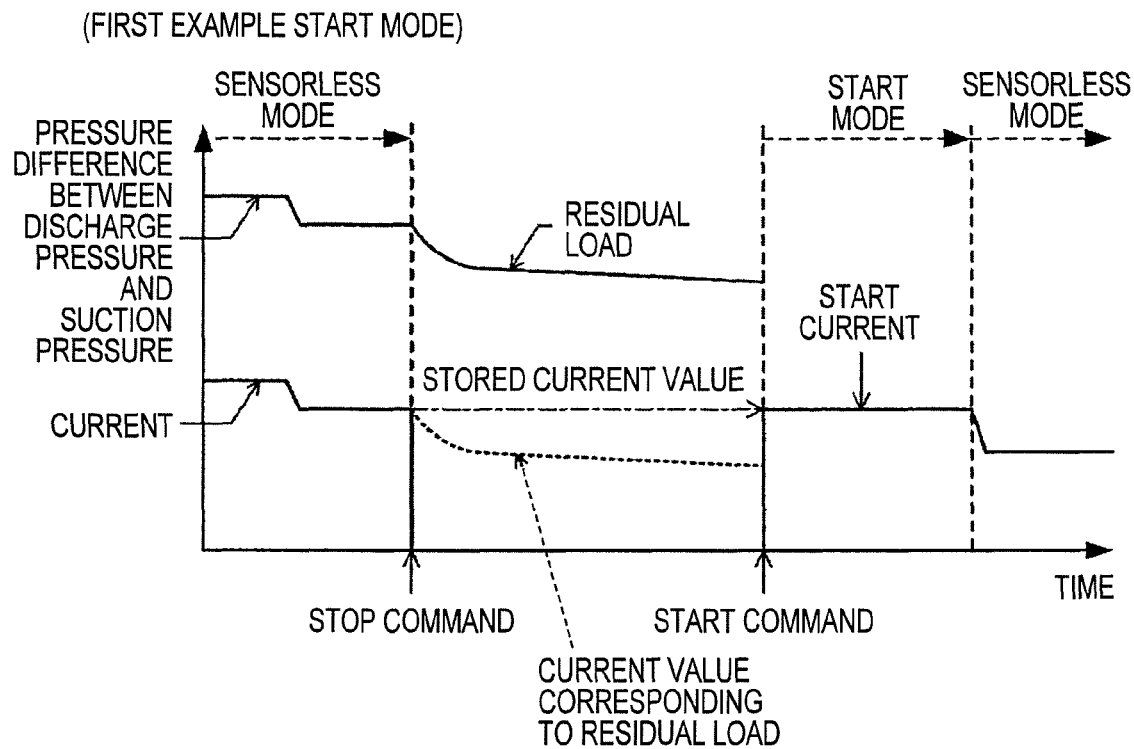
FIG. 5 is a diagram illustrating a first example of the start mode.

In the first example start mode illustrated in FIG. 5, the motor control device MC performs the following control: the current value at the time when the stop command to the synchronous motor M is issued is stored in the storage unit 6, and the target current value in the start mode is decided based on the current value stored in the storage unit 6 when the start command to the synchronous motor M is issued after the issuance of the stop command. The motor control device MC having the structure in FIG. 3 reads the stored current value in the storage unit 6 as the target current value in the start mode, and provides the target current value to the voltage calculation unit 9 via the addition unit 8. Here, the rotation speed setting unit 12 provides the target rotation speed value increasing at the predetermined acceleration stored therein, to the voltage calculation unit 9 until the shift rotation speed value set for shifting to the sensorless mode is reached.

As illustrated in FIG. 5, the stored current value stored in the storage unit 6 in response to the stop command reflects the pressure difference of the compression mechanism at the time of stop, and the residual load during stop decreases to a level less than or equal to this pressure difference. Accordingly, when the start command to restart the synchronous motor M is issued, the stored current value is set as the target current value in the start mode, to perform forced commutation control on the synchronous motor M. The target current value that is greater than the current value corresponding to the residual load and can produce sufficient torque for the residual load can thus be set. This enables the synchronous motor M to be successfully started without the maximum start current.

Figure 6:
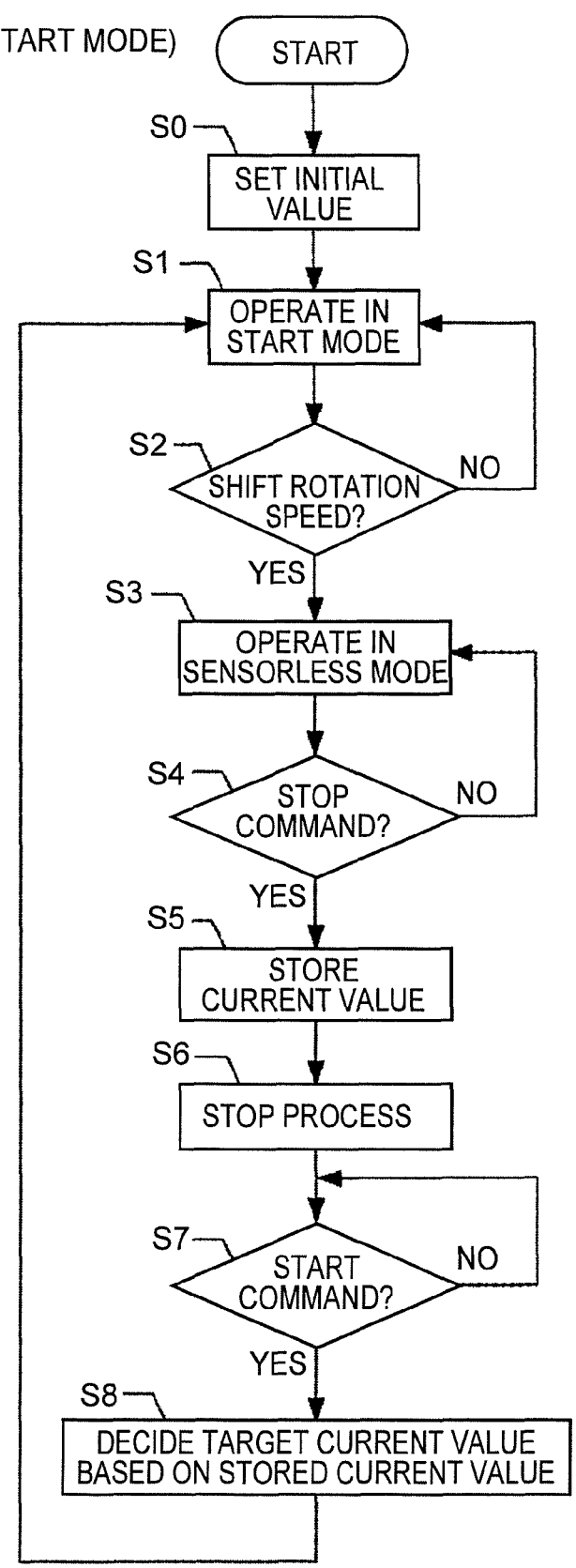
FIG. 6 is a flowchart of the first example start mode.

FIG. 6 is a flowchart of an example of control performed by the motor control device MC in the first example start mode.

In step S0, when the entire system starts (e.g. an air conditioner is turned on), the motor control device MC sets an initial value necessary for the start mode. Since this is the first start mode after power on and the load condition is unknown, the value for executing the start mode with the maximum start current is read from the storage unit 6 and set as the initial value. Next, in step S1, the motor control device MC executes the start mode, to operate the synchronous motor M by forced commutation control. In the start mode, the rotation speed setting unit 12 provides the target rotation speed value with the predetermined acceleration, to the voltage calculation unit 9. In step S2, the motor control device MC determines whether or not the target rotation speed value increasing at the acceleration reaches the shift rotation speed value for shifting to the sensorless mode.

In a case of determining in step S2 that the shift rotation speed value is reached, the motor control device MC advances to step S3 to shift to the sensorless mode, and the motor control device MC having the structure in FIG. 2 performs position detection operation. In step S4, the motor control device MC monitors whether or not the stop command is issued, while operating the synchronous motor M in the sensorless mode according to the target rotation speed value from the target rotation speed input unit 7.

In a case in which the issuance of the stop command is detected in step S4, in step S5 the motor control device MC stores the current value output from the current calculation unit 3 in the storage unit 6. The motor control device MC then advances to step S6 to perform the process of stopping the synchronous motor M. Next, in step S7, the motor control device MC monitors whether or not the start command to restart the synchronous motor M is issued. For example, the start command is issued as a start command to restart the operation of the compressor, that is, restart the synchronous motor M, from the external system control device, as with the stop command. In a case in which the issuance of the start command is detected in step 7, in step S8 the motor control device MC decides to set the stored current value stored in the storage unit 6 at the time of stop, as the target current value in the start mode. The motor control device MC executes the start mode in step S1, with the set target current value being provided to the voltage calculation unit 9 via the addition unit 8. The motor control device MC thus repeats steps S1 to S8 subsequently.

Second Example Start Mode

Figure 7:
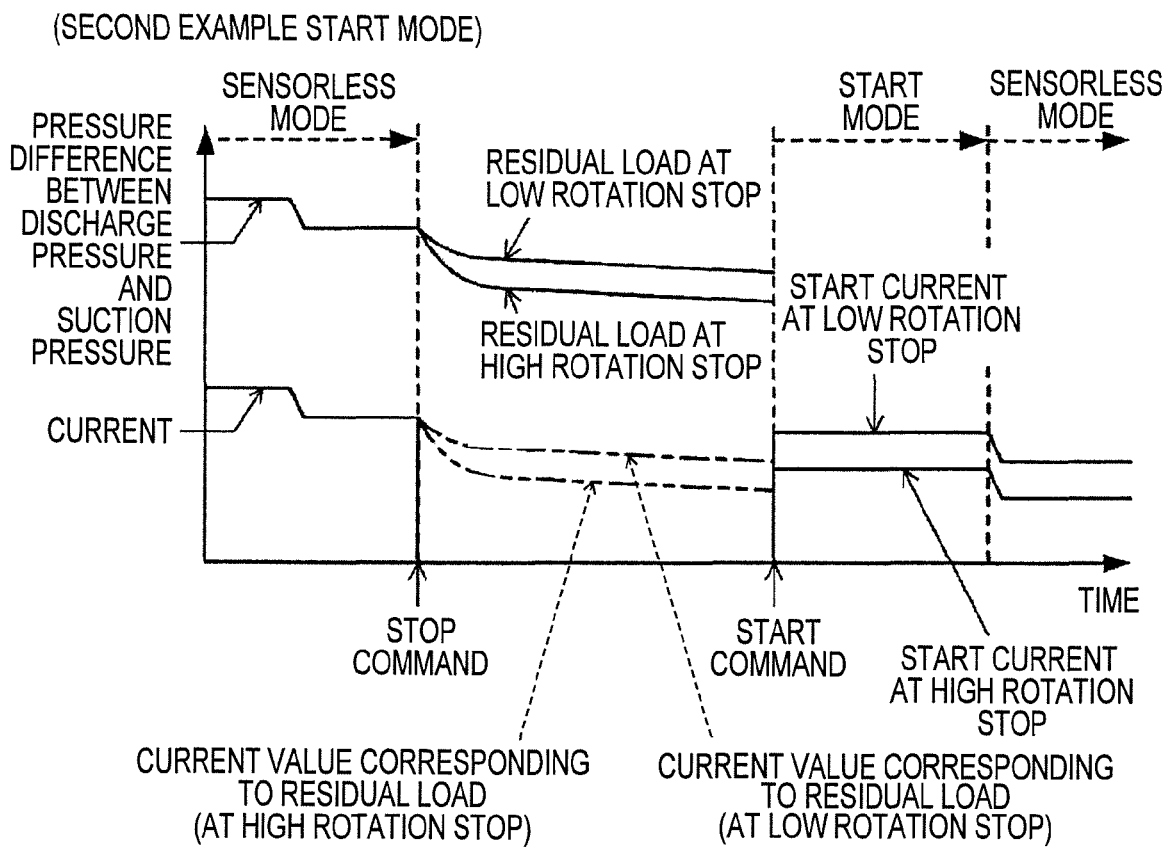
FIG. 7 is a diagram illustrating a second example of the start mode.

In the second example start mode illustrated in FIG. 7, the motor control device MC performs the following control: the current value and the rotation speed value at the time when the stop command to the synchronous motor M is issued are stored in the storage unit 6, and the target current value in the start mode is decided based on the current value and the rotation speed value stored in the storage unit 6 when the start command to the synchronous motor M is issued after the issuance of the stop command. The motor control device MC having the structure in FIG. 3 reads the stored current value in the storage unit 6 as the target current value in the start mode and also reads the stored rotation speed value in the storage unit 6 as a coefficient and, having corrected the stored current value using the stored rotation speed value, provides the corrected value to the voltage calculation unit 9 via the addition unit 8. Here, the rotation speed setting unit 12 provides the target rotation speed value increasing at the predetermined acceleration, to the voltage calculation unit 9 until the shift rotation speed value set for shifting to the sensorless mode is reached.

The residual load after the synchronous motor M stops decreases with time, as mentioned earlier. Here, the degree of decrease differs depending on the rotation speed of the synchronous motor M at the time of stop. In detail, since the expansion valve is more open when the synchronous motor M stops at a relatively high rotation speed than when the synchronous motor M stops at a relatively low rotation speed, the residual load in a case in which the synchronous motor M stops at a relatively high rotation speed decreases to a larger degree than the residual load in a case in which the synchronous motor M stops at a relatively low rotation speed, as illustrated in FIG. 7. Hence, the current corresponding to the residual load at relatively high rotation stop is smaller than the current corresponding to the residual load at relatively low rotation stop. In view of this, when the start command to restart the synchronous motor M is issued, the stored current value is corrected according to the stored rotation speed value, that is, the rotation speed at the time of stop, and the corrected value is set as the target current value in the start mode, to perform forced commutation control on the synchronous motor M. For relatively low rotation stop, a relatively large target current value suitable for the current value corresponding to the residual load at relatively low rotation stop is set. For relatively high rotation stop, on the other hand, a relatively small target current value suitable for the current value corresponding to the residual load at relatively high rotation stop is set. The target current value reduced in correspondence with the current value corresponding to the residual load more finely than in the first example start mode is thus decided in the start mode. The stored current value, the stored rotation speed value, and the target current value in the start mode may be obtained by experiment and stored in the storage unit 6 as map data beforehand.

Figure 8:
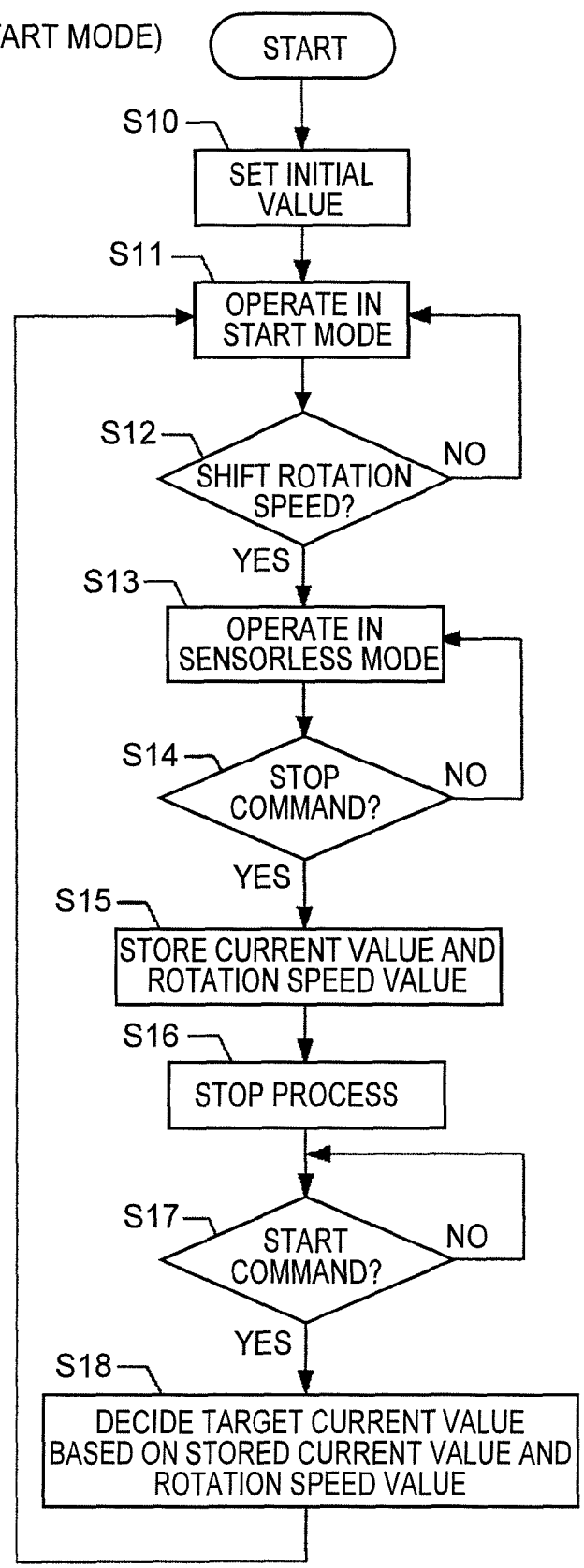
FIG. 8 is a flowchart of the second example start mode.

FIG. 8 is a flowchart of an example of control performed by the motor control device MC in the second example start mode.

In step S10, when the entire system starts, the motor control device MC sets an initial value necessary for the start mode. Since this is the first start mode after power on and the load condition is unknown, the value for executing the start mode with the maximum start current is read from the storage unit 6 and set as the initial value. Next, in step S11, the motor control device MC executes the start mode, to operate the synchronous motor M by forced commutation control. In the start mode, the rotation speed setting unit 12 provides the target rotation speed value with the predetermined acceleration, to the voltage calculation unit 9. In step S12, the motor control device MC determines whether or not the target rotation speed value increasing at the acceleration reaches the shift rotation speed value for shifting to the sensorless mode.

In a case of determining in step S12 that the shift rotation speed value is reached, the motor control device MC advances to step S13 to shift to the sensorless mode, and the motor control device MC having the structure in FIG. 2 performs position detection operation. In step S14, the motor control device MC monitors whether or not the stop command is issued, while operating the synchronous motor M in the sensorless mode according to the target rotation speed value from the target rotation speed input unit 7.

In a case in which the issuance of the stop command is detected in step S14, in step S15 the motor control device MC stores the current value output from the current calculation unit 3 and the rotation speed value output from the rotation speed calculation unit 5 in the storage unit 6. The motor control device MC then advances to step S16 to perform the process of stopping the synchronous motor M. Next, in step S17, the motor control device MC monitors whether or not the start command to restart the synchronous motor M is issued. In a case in which the issuance of the start command is detected in step S17, in step S18 the motor control device MC corrects the stored current value stored in the storage unit 6 at the time of stop according to the stored rotation speed value stored at the same time as the stored current value, and decides to set the corrected value as the target current value in the start mode, and then the motor control device MC provides the set target current value to the voltage calculation unit 9 via the addition unit 8. The motor control device MC, which executes the start mode in step S11 thereby, repeats steps S11 to S18 subsequently.

Third Example Start Mode

In the third example start mode illustrated in FIG. 9, the motor control device MC performs the following control: when the start command to the synchronous motor M is issued after the stop command to the synchronous motor M is issued, the target current value in the start mode is decided based on the time (stop duration) from the stop command to the start command. The motor control device MC stores the time at which the stop command is issued, in the storage unit 6. The motor control device MC compares the time at which the start command is issued and the stored stop command time, to calculate the stop duration. Alternatively, the motor control device MC starts an internal timer when the stop command is issued, and measures the time until the start command is issued, to calculate the stop duration. In the start mode to restart the synchronous motor M, the motor control device MC having the structure in FIG. 3 reads the target current value stored in the storage unit 6 beforehand depending on the obtained stop duration, and provides the target current value to the voltage calculation unit 9 via the addition unit 8. Here, the rotation speed setting unit 12 provides the target rotation speed value increasing at the predetermined acceleration, to the voltage calculation unit 9 until the shift rotation speed value set for shifting to the sensorless mode is reached.

Figure 9A:
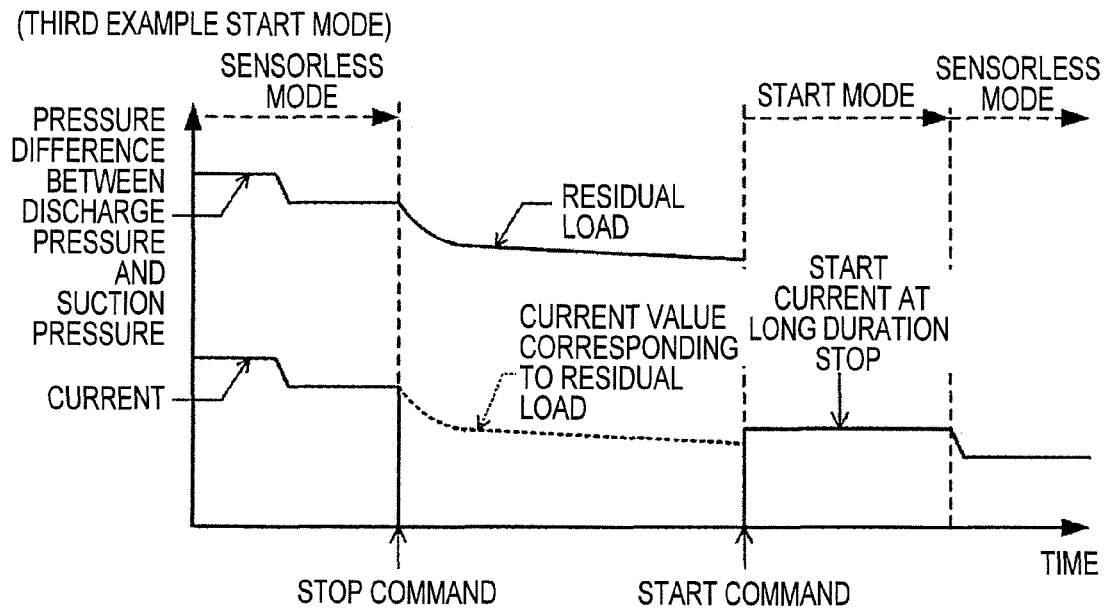
FIG. 9 is a diagram illustrating a third example of the start mode.
Figure 9B:
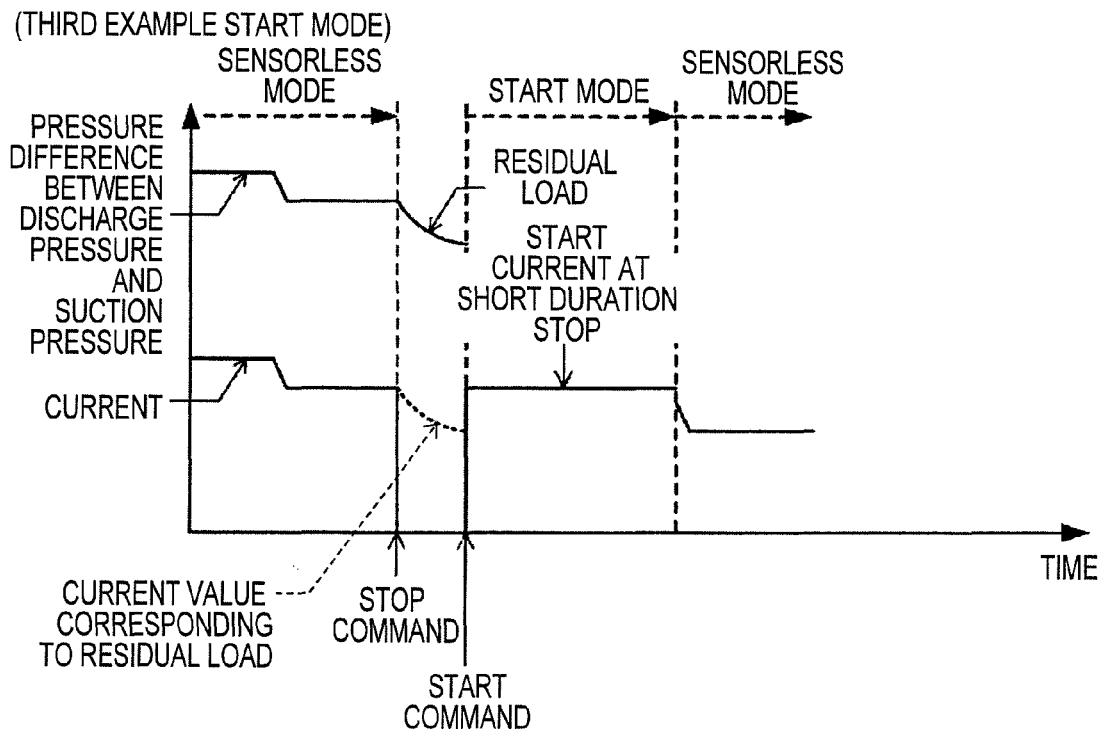

The residual load after the synchronous motor M stops decreases with time, as mentioned earlier. Accordingly, the current value corresponding to the residual load is smaller when the stop duration from the stop command to the start command is longer. In detail, the residual load in a case in which the stop duration is relatively long decreases more than the residual load in a case in which the stop duration is relatively short, as illustrated in FIGS. 9A and 9B by comparison. Hence, the current corresponding to the residual load at relatively long duration stop is smaller than the current corresponding to the residual load at relatively short duration stop. In view of this, when the start command to restart the synchronous motor M is issued, the target current value in the start mode is set depending on the stop duration up to the issuance of the start command, to perform forced commutation control on the synchronous motor M. For relatively short duration stop, a relatively large target current value suitable for the current value corresponding to the residual load at relatively short duration stop is set. For relatively long duration stop, on the other hand, a relatively small target current value suitable for the current value corresponding to the residual load at relatively long duration stop is set. The target current value reduced in correspondence with the current value corresponding to the residual load finely depending on the stop duration is thus decided in the start mode. The target current value in the start mode depending on the stop duration may be obtained by experiment and stored in the storage unit 6 as map data beforehand.

FIG. 10 is a flowchart of an example of control performed by the motor control device MC in the third example start mode.

In step S20, when the entire system starts, the motor control device MC sets an initial value necessary for the start mode. Since this is the first start mode after power on and the load condition is unknown, the value for executing the start mode with the maximum start current is read from the storage unit 6 and set as the initial value. Next, in step S21, the motor control device MC executes the start mode, to operate the synchronous motor M by forced commutation control. In the start mode, the rotation speed setting unit 12 provides the target rotation speed value with the predetermined acceleration, to the voltage calculation unit 9. In step S22, the motor control device MC determines whether or not the target rotation speed value increasing at the acceleration reaches the shift rotation speed value for shifting to the sensorless mode.

In a case of determining in step S22 that the shift rotation speed value is reached, the motor control device MC advances to step S23 to shift to the sensorless mode, and the motor control device MC having the structure in FIG. 2 performs position detection operation. In step S24, the motor control device MC monitors whether or not the stop command is issued, while operating the synchronous motor M in the sensorless mode according to the target rotation speed value from the target rotation speed input unit 7.

In a case in which the issuance of the stop command is detected in step S24, in step S25 the motor control device MC stores the present time indicated by an internal clock or the like, in the storage unit 6 as the stop time (the time of issuance of the stop command). Alternatively, the motor control device MC starts an internal stop duration timer as an example, in order to measure the stop duration. In step S25, the motor control device MC may also store the current value at the time of issuance of the stop command in the storage unit 6, as in the first example start mode.

The motor control device MC then advances to step S26 to perform the process of stopping the synchronous motor M. Next, in step S27, the motor control device MC monitors whether or not the start command to restart the synchronous motor M is issued. In a case in which the issuance of the start command is detected in step S27, in step S28 the motor control device MC calculates the stop duration by, for example, subtracting the stored stop time in the storage unit 6 from the start time (the time of issuance of the start command) which is the present time indicated by the internal clock or the like. Alternatively, in a case in which the stop duration timer is started in step S25, the motor control device MC reads the value of the stop duration timer as the stop duration. In step S29, the motor control device MC decides the target current value in the start mode depending on the stop duration. For example, in step S29, the target current value stored in the storage unit 6 beforehand as map data in correlation with the stop duration may be read depending on the stop duration obtained in step S28. In a case in which the current value at the time of stop is also stored in the storage unit 6 in step S25, the target current value may be decided depending on both the stored current value and the stop duration. The motor control device MC executes the start mode in step S21, with the decided target current value being provided to the voltage calculation unit 9 via the addition unit 8. The motor control device MC thus repeats steps S21 to S29 subsequently.

Fourth Example Start Mode and Fifth Example Start Mode

In the fourth example start mode illustrated in FIG. 11 and the fifth example start mode illustrated in FIG. 12, the motor control device MC performs the following control: the current value at the time when the stop command to the synchronous motor M is issued is stored in the storage unit 6, and the time until the end of the start mode, that is, the execution time of the start mode, is decided based on the current value stored in the storage unit 6 when the start command to the synchronous motor M is issued after the issuance of the stop command. The motor control device MC having the structure in FIG. 3 in the start mode decides the execution time of the start mode, by changing the rotation speed value for determining the end of the start mode (the shift rotation speed value for determining the shift to the sensorless mode in this example) depending on the stored current value in the storage unit 6 (fourth example start mode). Alternatively, the motor control device MC having the structure in FIG. 3 in the start mode decides the execution time of the start mode, by changing the acceleration of the rotation speed in the start mode depending on the stored current value in the storage unit 6 (fifth example start mode).

In the fourth example start mode, the rotation speed setting unit 12 provides the target rotation speed value increasing at the predetermined acceleration to the voltage calculation unit 9, and changes the shift rotation speed value set for shifting to the sensorless mode, which is to be ultimately reached by the rotation speed with the acceleration, depending on the stored current value read from the storage unit 6. In the fifth example start mode, the rotation speed setting unit 12 changes the acceleration of the target rotation speed value provided to the voltage calculation unit 9 depending on the stored current value read from the storage unit 6, and provides the target rotation speed value with the acceleration to the voltage calculation unit 9 until the target rotation speed value reaches the shift rotation speed value for shifting to the sensorless mode.

In the fourth example start mode and the fifth example start mode, not the current value but the length of the execution time of the start mode is controlled in correlation with the residual load. Here, the start current value may be set to the maximum current, or the current depending on the stored current value as in the first example start mode or the second example start mode.

Figure 11A:
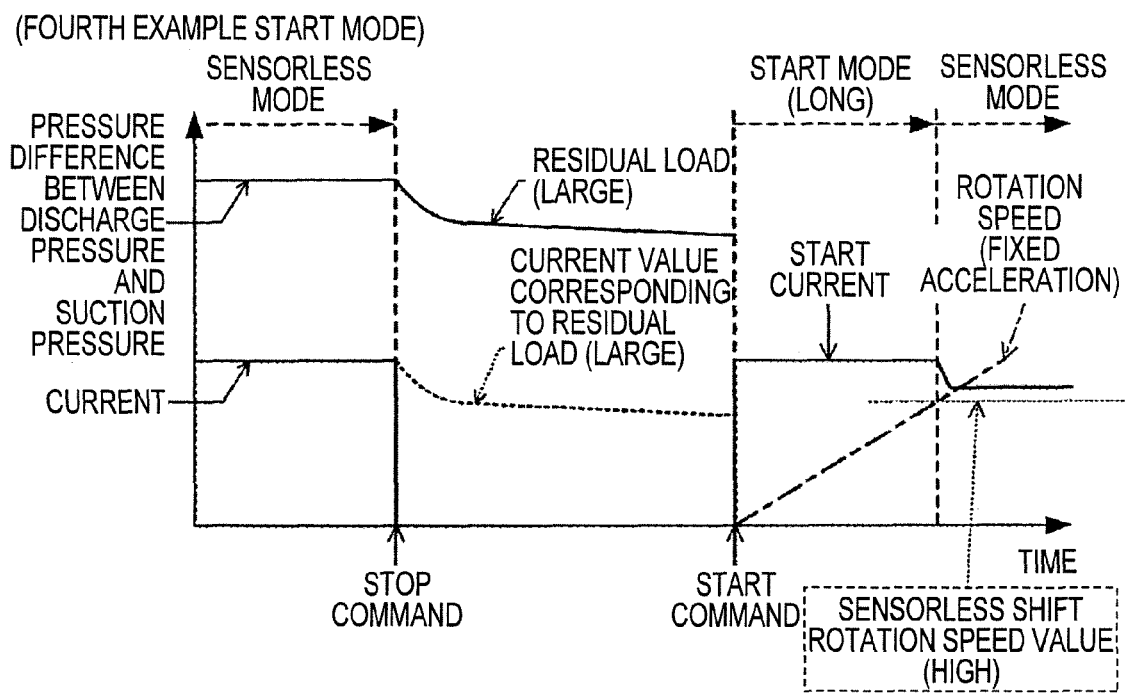
FIG. 11 is a diagram illustrating a fourth example of the start mode.
Figure 11B:
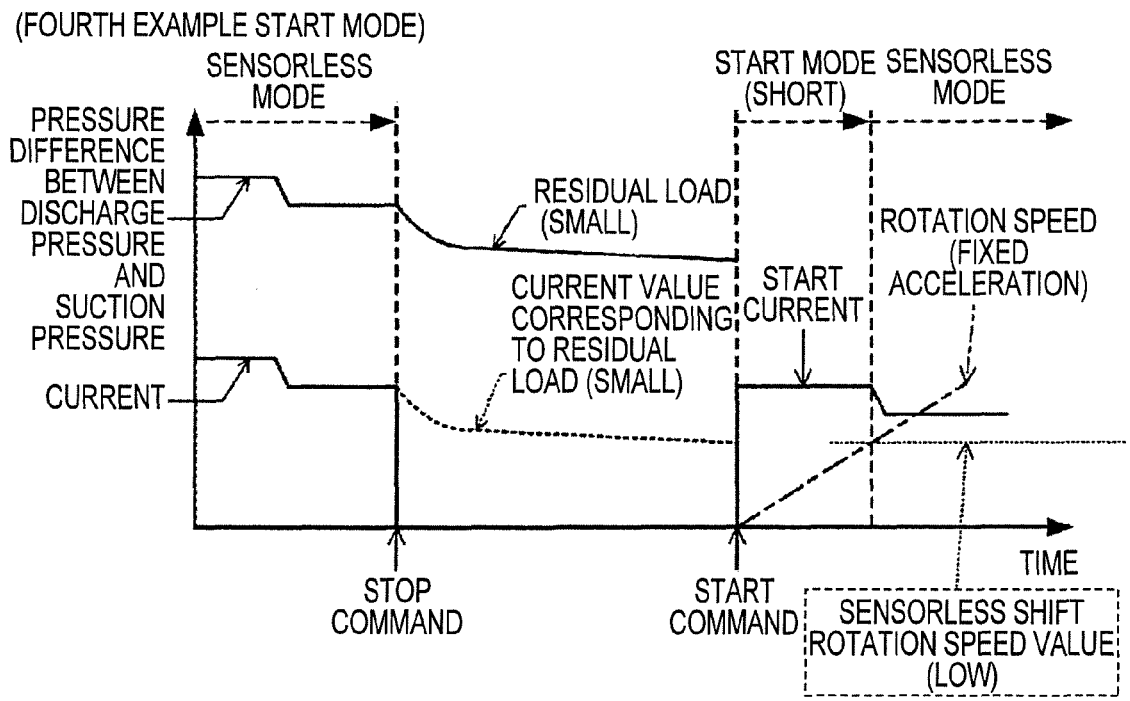

In the fourth example start mode, the execution time of the start mode is controlled by changing the shift rotation speed value for determining the shift to the sensorless mode depending on the stored current value in the storage unit 6, that is, the residual load, while the acceleration at which the rotation speed of the synchronous motor M gradually increases is fixed, as illustrated in FIGS. 11A and 11B by comparison. The shift rotation speed value for shifting to the sensorless mode can be set relatively low in a case in which the residual load (current value corresponding to the residual load) is relatively small (FIG. 11B), as compared with a case in which the residual load is relatively large (FIG. 11A). When the shift rotation speed value is relatively high, the time until the rotation speed with the fixed acceleration reaches the shift rotation speed value is relatively long (FIG. 11A). When the shift rotation speed value is relatively low, on the other hand, the time until the rotation speed with the fixed acceleration reaches the shift rotation speed value is relatively short (FIG. 11B).

Figure 12A:
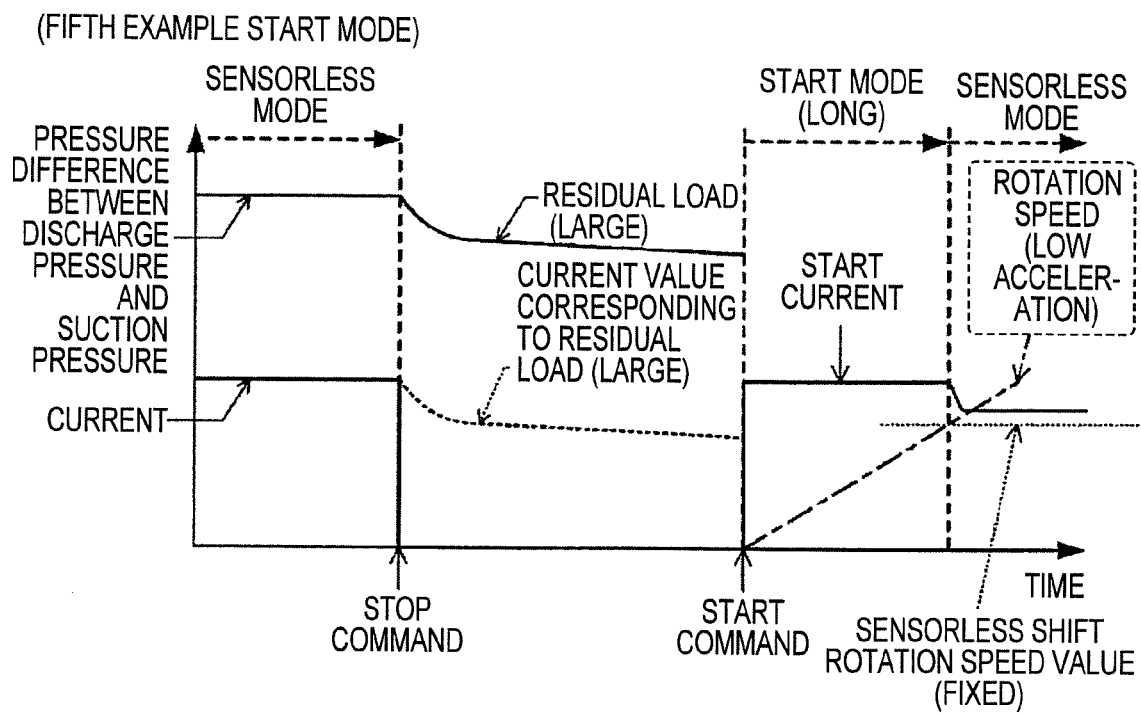
FIG. 12 is a diagram illustrating a fifth example of the start mode.
Figure 12B:
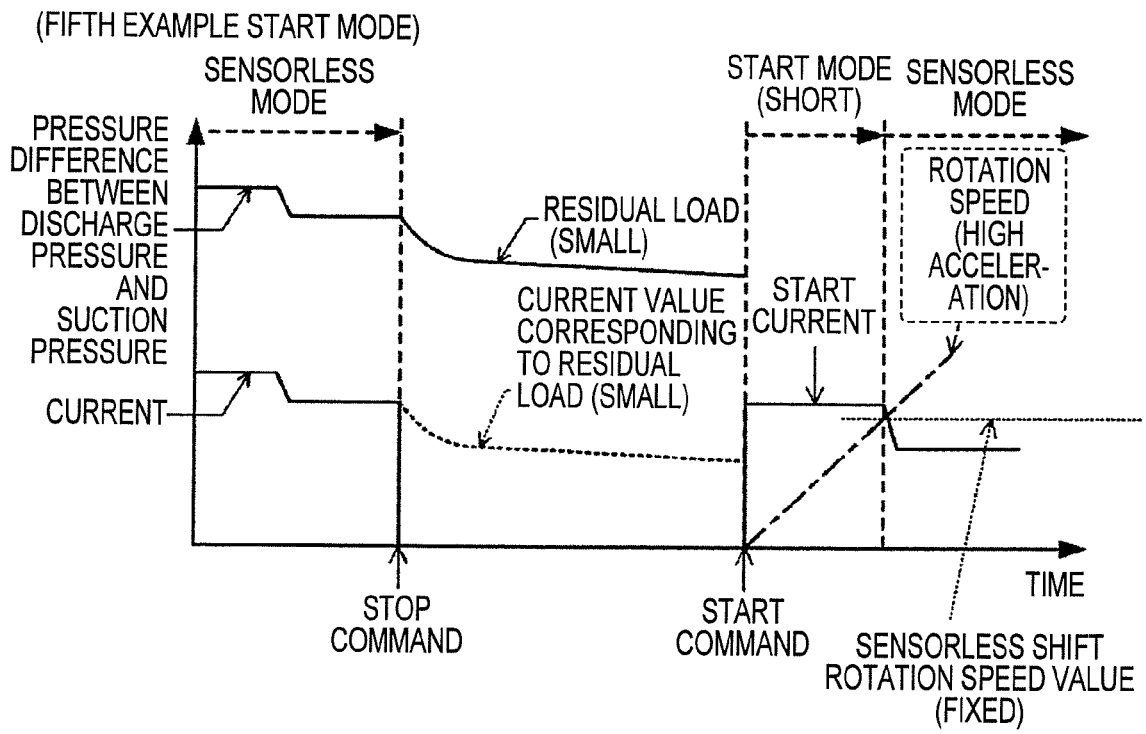

In the fifth example start mode, the execution time of the start mode is controlled by changing the acceleration at which the rotation speed of the synchronous motor M gradually increases depending on the stored current value in the storage unit 6, as illustrated in FIGS. 12A and 12B by comparison. Meanwhile, the shift rotation speed value for determining the shift to the sensorless mode is fixed. The acceleration of the rotation speed in the start mode can be set relatively high in a case in which the residual load (current value corresponding to the residual load) is relatively small (FIG. 12B), as compared with a case in which the residual load is relatively large (FIG. 12A). When the acceleration of the rotation speed is relatively low, the time until the fixed shift rotation speed value is reached is relatively long (FIG. 12A). When the acceleration of the rotation speed is relatively high, on the other hand, the time until the fixed shift rotation speed value is reached is relatively short (FIG. 12B).

The shift rotation speed value or the acceleration value depending on the current value at the time of stop may be obtained by experiment and stored in the storage unit 6 as map data beforehand.

FIG. 13 is a flowchart of an example of control performed by the motor control device MC in the fourth example start mode and the fifth example start mode.

In step S30, when the entire system starts, the motor control device MC sets an initial value necessary for the start mode. Since this is the first start mode after power on and the load condition is unknown, the value for executing the start mode with the maximum start current is read from the storage unit 6 and set as the initial value. Next, in step S31, the motor control device MC executes the start mode, to operate the synchronous motor M by forced commutation control. In the start mode, the rotation speed setting unit 12 provides the target rotation speed value with the predetermined acceleration, to the voltage calculation unit 9. In step S32, the motor control device MC determines whether or not the target rotation speed value increasing at the acceleration reaches the shift rotation speed value for shifting to the sensorless mode.

In a case of determining in step S32 that the shift rotation speed value is reached, the motor control device MC advances to step S33 to shift to the sensorless mode, and the motor control device MC having the structure in FIG. 2 performs position detection operation. In step S34, the motor control device MC monitors whether or not the stop command is issued, while operating the synchronous motor M in the sensorless mode according to the target rotation speed value from the target rotation speed input unit 7.

In a case in which the issuance of the stop command is detected in step S34, in step S35 the motor control device MC stores the current value output from the current calculation unit 3 in the storage unit 6. The motor control device MC then advances to step S36 to perform the process of stopping the synchronous motor M. Next, in step S37, the motor control device MC monitors whether or not the start command to restart the synchronous motor M is issued. In a case in which the issuance of the start command is detected in step S37, in step S38 the motor control device MC decides the shift rotation speed value for shifting to the sensorless mode in the fourth example start mode and decides the acceleration of the target rotation speed value in the fifth example start mode, depending on the stored current value stored in the storage unit 6 at the time of stop, and sets the decided value in the rotation speed setting unit 12. Here, the target current value provided to the voltage calculation unit 9 via the addition unit 8 is the initial value in step S30 or the stored current value read from the storage unit 6. The motor control device MC performs forced commutation control in the start mode in step S31. The motor control device MC thus repeats steps S31 to S38 subsequently.

As a result of the execution of each of the start modes described above, the circuit life of the drive circuit PM can be extended by reducing the start current, without sacrificing the start performance of the synchronous motor M. The start modes are not limited to the examples presented above, and other examples, such as combinations of the start modes, are also possible.

REFERENCE SYMBOL LIST

PM Drive circuit
M Synchronous motor
MC Motor control device
1 Current detection unit
2 Conversion calculation unit
3 Current calculation unit
4 Rotor position detection unit
5 Rotation speed calculation unit
6 Storage unit
7 Target rotation speed input unit
8 Addition unit
9 Voltage calculation unit
10 Conversion calculation unit
11 Inverter drive unit
12 Rotation speed setting unit

The invention claimed is:

1. A motor control method for controlling a synchronous motor with a start mode in which a rotor is rotated by forced commutation control, the motor control method comprising:
storing a current value at the time when a stop command to the synchronous motor is issued;
storing a rotation speed value when the stop command to the synchronous motor is issued; and
deciding a target current value in the start mode based on the stored current value and the stored rotation speed value, when a start command to the synchronous motor is issued after the issuance of the stop command.

2. A motor control method for controlling a synchronous motor with a start mode in which a rotor is rotated by forced commutation control, the motor control method comprising:
storing a current value at the time when a stop command is issued; and
deciding, when a start command to the synchronous motor is issued after the stop command to the synchronous motor is issued, a target current value in the start mode based on a time from the stop command to the start command and based on the stored current value.

3. A motor control method for controlling a synchronous motor with a start mode in which a rotor is rotated by forced commutation control, the motor control method comprising:
storing a current value at the time when a stop command to the synchronous motor is issued; and
deciding a time until end of the start mode based on the stored current value, when a start command to the synchronous motor is issued after the issuance of the stop command.

4. The motor control method according to claim 3, wherein the time until the end of the start mode is decided by changing, depending on the stored current value, a rotation speed value for determining the end of the start mode.

5. The motor control method according to claim 3, wherein the time until the end of the start mode is decided by changing, depending on the stored current value, acceleration of a rotation speed in the start mode.

6. The motor control method according to claim 3, further comprising:
deciding a target current value in the start mode, based on the stored current value.

* * * * *